United States Patent [19]

Woods

[11] Patent Number: 4,484,385
[45] Date of Patent: Nov. 27, 1984

[54] METHOD OF FORMING SEALED NUT AND PANEL ASSEMBLY

[75] Inventor: Harold T. Woods, Livonia, Mich.

[73] Assignee: Multifastener Corporation, Southfield, Mich.

[21] Appl. No.: 397,756

[22] Filed: Jul. 13, 1982

[51] Int. Cl.³ .............................................. B23P 11/00
[52] U.S. Cl. .................................... 29/432.2; 29/798
[58] Field of Search ..................... 29/798, 432, 432.1, 29/432.2, 509, 522

[56] References Cited

U.S. PATENT DOCUMENTS

| | | | |
|---|---|---|---|
| 2,750,660 | 6/1956 | Newcomb | 29/432 |
| 2,799,188 | 7/1957 | Newcomb | 29/432 |
| 3,213,914 | 10/1965 | Baumle et al. | 29/432 |
| 3,282,315 | 11/1966 | Zahodiakin | 29/432 |
| 3,469,613 | 9/1969 | Steward | 29/432 |
| 3,724,520 | 4/1973 | Ladouceur et al. | 29/432 |
| 3,810,291 | 5/1974 | Ladouceur | 29/432 |
| 4,153,989 | 5/1979 | Shinjo | 29/432 |

Primary Examiner—Howard N. Goldberg
Assistant Examiner—Steven E. Nichols
Attorney, Agent, or Firm—Cullen, Sloman, Cantor, Grauer, Scott & Rutherford

[57] ABSTRACT

The disclosed method and apparatus is adapted to form a low pressure fluid sealed nut and panel assembly for a flush mounted self-piercing bearing nut having a rectangular piercing pilot, panel bearing flanges on opposed sides of the nut and grooves in the flanges, adjacent the pilot, retaining the pierced panel edges. The improved method includes simultaneously shearing and deforming the nonflanged top edges and corners of the nut pilot beneath the panel to form a panel bearing surface on all four sides of the pilot and deforming the pierced panel edges into the grooves and against the grooved bottom walls and inner pilot walls, spaced from the bottom walls of the grooves, to form a sealed nut and panel assembly. The apparatus includes a clinch die having an opening configured to deform the pilot, as described, and clinching lips forming the panel in the nut grooves in sealed relation.

4 Claims, 8 Drawing Figures

U.S. Patent    Nov. 27, 1984    Sheet 1 of 2    4,484,385
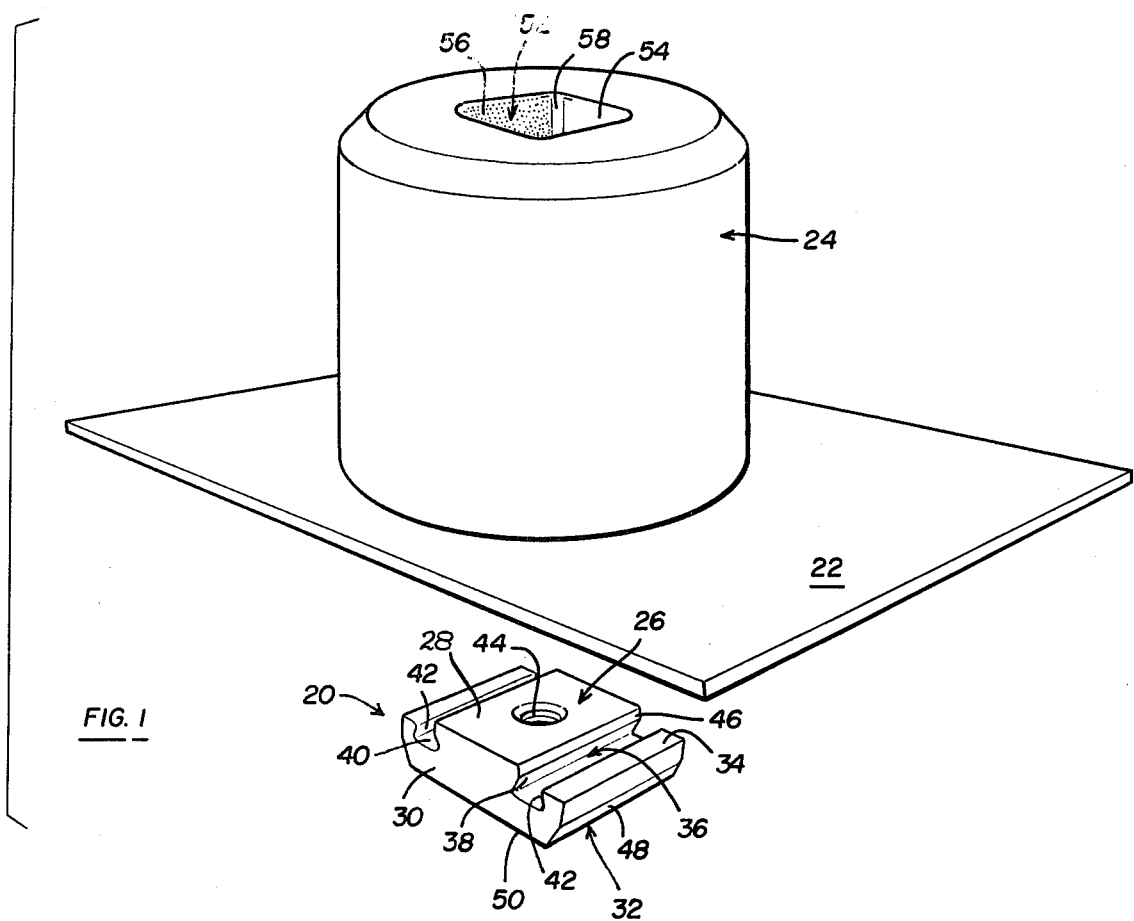
FIG. 1
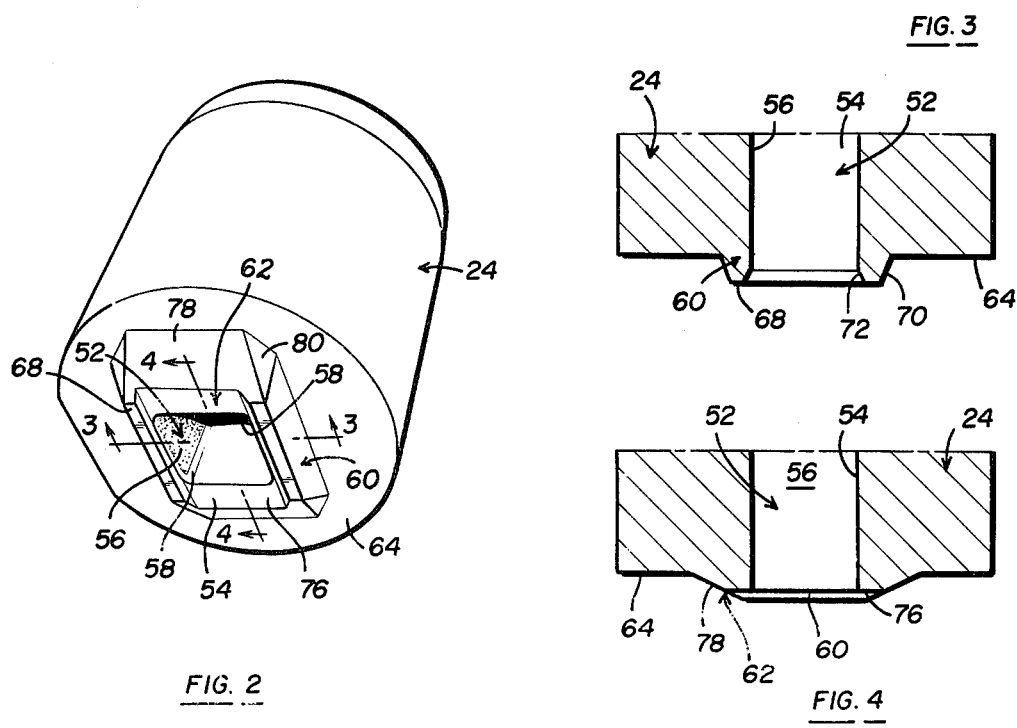
FIG. 2
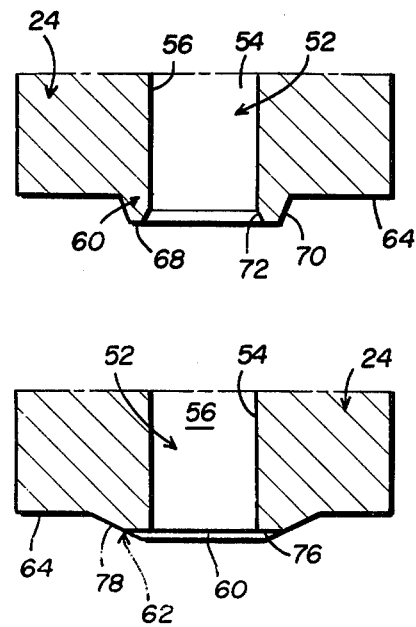
FIG. 3
FIG. 4

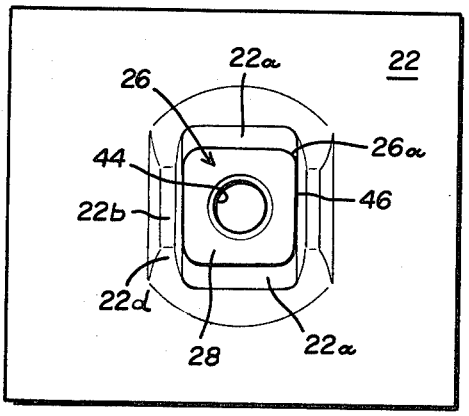
FIG. 5
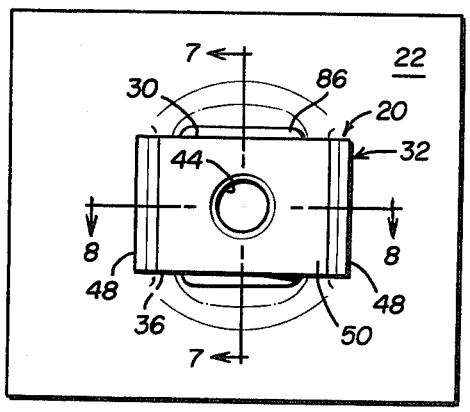
FIG. 6
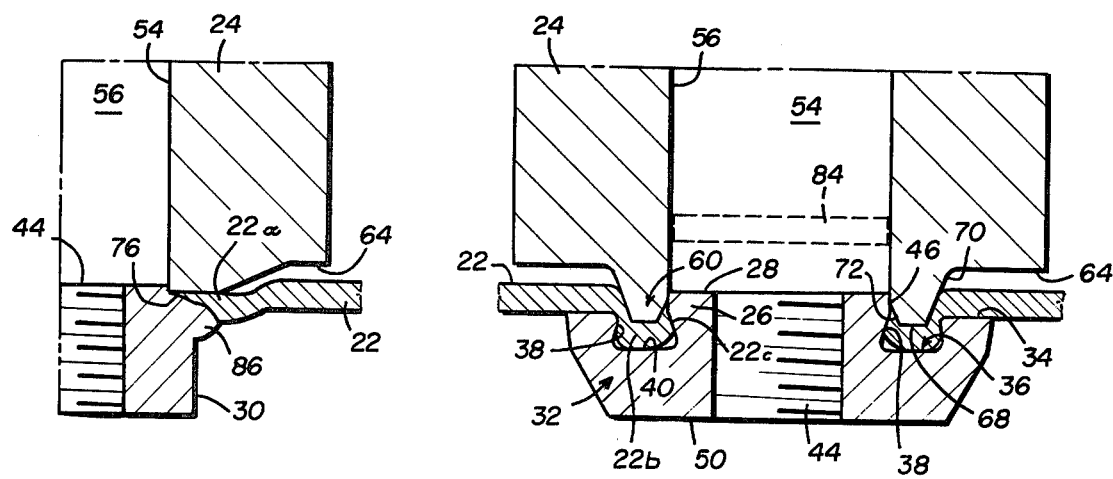
FIG. 7
FIG. 8

METHOD OF FORMING SEALED NUT AND PANEL ASSEMBLY

FIELD OF THE INVENTION

A method of forming low pressure fluid sealed nut and panel assembly wherein the nut pilot pierces an opening in the panel and the pilot is deformed to form panel bearing surfaces completely around the pilot; a clinch die assembly forming the sealed nut and panel assembly; and, the improved nut and panel assembly formed by the method of this invention.

DESCRIPTION OF THE PRIOR ART

Pierce and clinch nuts of the type disclosed herein have been commercially successful, particularly in the automotive industry. U.S. Pat. No. 3,648,747 discloses the general configuration of the nut and panel assembly of the present invention. As disclosed, the nut includes a rectangular pilot portion, panel bearing flange portions on opposed sides of the nut, and re-entrant grooves in the flange portions, adjacent the pilot. The nut is flush mounted on a panel by piercing the panel with the nut pilot and deforming the pierced panel edges into the re-entrant grooves, preferably without slitting the panel at the outer groove walls. The resultant nut and panel assembly has substantially improved push-out and pull-through strength, as compared with the prior art.

Pierce nuts of this general configuration have also been used to form nut and panel assemblies, wherein the pierce nut pilot is deformed on the nonflanged ends, beneath the panel, to form additional panel bearing abutments, however the panel was simultaneously slit or severed at the outer groove walls when the panel was deformed into the re-entrant grooves; see for example U.S. Pat. No. 3,439,723. Corner clinching of the nut pilot has also been used commercially to increase the strength of the nut and panel assembly, including pierce nuts of the general configuration disclosed herein; see U.S. Pat. Nos. 2,750,660 and 2,799,188. All of the above referenced patents are assigned to the assignee of the instant application and the disclosures of such patents are incorporated herein by reference.

Certain nut and panel assembly applications require a low pressure fluid seal between the nut and panel assembly. In certain automotive applications, for example, water or other fluid must be prevented from seeping through the joint to prevent rust or contamination of the panel assembly. The automotive specification requires that the joint contain the fluid and prevent seepage, as described herein. Various attempts have been made to develop a low pressure fluid sealed nut and panel assembly using the pierce nut described herein, however such attempts have not provided consistent fluid tight joints, as provided by the nut and panel assembly and method of this invention.

SUMMARY OF THE INVENTION

As described, the method of forming a sealed nut and panel assembly of this invention preferably utilizes a self-piercing nut including a rectangular pilot having a top piercing face, end walls perpendicular to the top face of the pilot and flange portions on opposed sides of the pilot. The flange portions include bearing surfaces lying in a plane spaced from the top piercing face of the pilot and parallel grooves on opposed sides of the pilot, preferably re-entrant grooves having at least one inclined side wall forming a restricted opening to the grooves. Each of the grooves includes an inner side wall adjacent the pilot, a bottom wall and an outer wall extending to the flange bearing surface.

As described, the disclosed method includes piercing the panel with the top face of the nut pilot, removing a rectangular slug from the panel, and disposing the pilot through the pierced panel opening. The method of this invention includes shearing and deforming the edges of the pilot at the end faces and the pilot corners toward the plane of flange bearing surfaces, beneath the panel, until the panel bottoms on the flange bearing surfaces, forming panel bearing surfaces completely around the nut pilot. The pierced panel edges overlying the grooves are simultaneously deformed into the groove openings. The pierced panel edges are deformed into the grooves until the panel engages the groove bottom wall, spaced from its distal edges, and the distal panel edges are deformed into sealing engagement with the groove inner walls, spaced from the bottom walls of the grooves. The panel is thus continuous at the radiused corners of the pilot and into the nut grooves, in sealing engagement, and the panel is supported in bearing relation on all four sides of the pilot, providing a low pressure fluid sealed joint.

The apparatus of this invention, which performs the method described, includes a die member having a generally rectangular opening having a width between the opposed end walls, which receive the end walls of the nut pilot, less than the width of the nut, and arcuate corners, which shear and deform the pilot end walls and corners, forming the bearing panel support abutments described. The die member includes upstanding elongated clinching lips on opposed sides of the die opening. The clinching lips preferably are truncated, including a flat top portion, tapered side walls and tapered inner walls, which deform the pierced panel edges into the groove openings in sealing engagement, as described. The preferred die member also includes upstanding spanking lips adjacent the end walls of the die opening. The height of the spanking lips can be the same as or less than the height of the clinching lips and the length of the spanking lips is less than the die opening. The spanking lips shear and deform the nut pilot end walls beneath the panel, as described.

The nut and panel assembly of this invention thus comprises a nut having a generally rectangular pilot, end walls preferably generally perpendicular to the top face of the pilot, flange portions extending from opposed sides of the nut pilot having bearing surfaces spaced below the plane of the pilot top face and generally parallel grooves in the flange portions on opposed sides of the pilot. The panel is bottomed on the flange bearing surfaces and includes a generally rectangular pierced opening which receives the pilot therethrough. Bearing ledge abutments are formed on the opposed end walls of the pilot forming panel bearing surfaces on all four sides of the pilot which support the panel. The panel is deformed and continuous into the nut grooves and the panel is bottomed on the nut groove bottom walls, spaced from the inner side walls of the groove, with the distal edges of the pierced panel engaging the inner groove walls, spaced from the bottom groove wall, forming a low pressure fluid seal in combination with the bearing engagement of the panel with the nut, described above.

The method and apparatus of this invention thus forms an improved low pressure fluid sealed nut and panel assembly, utilizing a conventional flush mounted pierce nut, providing additional bearing support for the nut. The method may be accomplished in one continuous stroke of the die assembly. Other advantages and meritorious features of the present invention will be more fully understood from the following description of the preferred embodiments and method of this invention, the appended claims and the drawings, a brief description of which follows.

BRIEF DESCRIPTION OF THE DRAWINGS

FIG. 1 is an exploded perspective side elevation of the preferred embodiment of the pierce nut ready for installation in a panel by the die member;

FIG. 2 is a top or end perspective view of the preferred embodiment of the die member;

FIG. 3 is a side cross-sectional view of the die member shown in FIG. 2, in the direction of view arrows 3—3;

FIG. 4 is a side cross-sectional view of the die member shown in FIG. 2, in the direction of view arrows 4—4;

FIG. 5 is a bottom view of the preferred embodiment of the nut and panel assembly formed by the die member shown in FIGS. 1-4;

FIG. 6 is a top view of the nut and panel assembly shown in FIG. 5;

FIG. 7 is a partial cross-sectional view of the nut and panel assembly shown in FIG. 6, with the die member, in the direction of view arrows 7—7; and FIG. 8 is a side cross-sectional view of the nut and panel assembly shown in FIG. 6, with the die member, in the direction of view arrows 8—8.

DESCRIPTION OF THE PREFERRED EMBODIMENTS AND METHOD OF THIS INVENTION

FIG. 1 shows a pierce nut 20 of the type utilized to form a low pressure fluid sealed nut and panel assembly of this invention, ready for installation in a panel 22 by die member 24. The preferred embodiment of the pierce nut includes a central rectangular pilot portion 26 having a flat top piercing face, end walls 30 generally perpendicular to the top face 28 of the pilot and integral flange portions 32 on opposed sides of the pilot. The flange portions include top panel bearing faces 34 spaced below the plane of the top face 28 of the pilot, and parallel grooves 36 on opposed sides of the pilot 26 extending perpendicular to the end walls 30 of the nut.

It will be understood that "top" and "bottom" are relative terms and are used herein for purposes of description only. Further, the pierce nut, panel and die member are arranged in the drawings to illustrate the method of forming the nut and panel assembly of this invention. In actual use, the die member 24 will generally be the lower or bottom element and the pierce nut is moved downwardly by the pierce nut installation head to form the nut and panel assembly. As disclosed in the above referenced United States patents assigned to the assignee of the present application, a pierce nut is generally installed by a pierce nut installation head in a die press assembly. The panel may be simultaneously formed in the die press, particularly in automotive applications, and several pierce nuts may be simultaneously installed in the panel, in one stroke of the press. FIG. 1, however, illustrates a commercial application, regardless of whether the pierce nut 20 is located above or below the die member 24, with the panel 22 located therebetween.

The parallel grooves 36 each include an inner side wall 38, a bottom wall 40 and an outer side wall 42. In the disclosed and preferred embodiment of the pierce nut 20, the grooves are re-entrant, wherein one or both of the inner and outer side walls, 38 and 42 respectively, are inclined inwardly, toward the longitudinal axis of the groove, to form a restricted groove opening. The re-entrant grooves entrap the panel metal deformed into the grooves substantially improving nut retention, as described in the above referenced U.S. Pat. No. 3,648,747.

The disclosed pierce nut 20 includes a central threaded bore 44 having an axis generally perpendicular to the top face 28 of the pilot 26. In the disclosed embodiment of the pierce nut, the pilot also includes side walls 46 perpendicular to the top face 28 of the pilot, and the sides 46 of the flanges are truncated primarily to reduce the weight or mass of the pierce nut. The bottom face 50 of the pierce nut is preferably flat and generally parallel to the top face 28 of the pilot. As described in the above-referenced patents of the assignee, the bottom face 50 is engaged by a plunger of an installation apparatus or head, not shown, to form the nut and panel assembly; see also U.S. Pat. Nos. 3,108,368 and 3,969,808, which disclose suitable installation heads which may be utilized to form the nut and panel assembly of this invention. Both of the above-referenced patents are assigned to the assignee of the present application and the disclosures are incorporated herein by reference.

The die member 24, which is shown in more detail in FIGS. 2 to 4, includes a central, generally rectangular opening 52 having opposed end walls 54 and opposed perpendicular side walls 56, joined by arcuate internal corners 58. Upstanding clinching lips 60 are provided on opposed sides of the die opening adjacent the internal side walls 56, and upstanding spanking lips 62 are provided adjacent the internal end walls 54 of the die opening. As shown, the clinching lips 60 and spanking lips 62 extend from the end face 64 of the die member, which is generally flat. The external configuration of the die member, which is cylindrical in the disclosed embodiment, is a matter of choice and design.

The clinching lips 60, best shown in FIG. 3, each include a flat top or end face 68, an outwardly tapering or truncated outer wall 70 and an inwardly tapering or truncated inner wall 72. The inner walls 72 of the clinching lips terminate in the side walls 56 of the die opening. The spanking lips 62, best shown in FIG. 4, each include a flat top or end face 76 and an outwardly tapering or truncated outer wall 78. It will be noted from FIGS. 2 and 4 that the clinching lips 60 extend further from the plane of the end face 64 of the die member than the spanking lip 62. As best shown in FIG. 2, the clinching lips 60 and spanking lips 62 join to form an enclosure around the opening 52 in the die member. The corners 80 at the junction of the clinching and spanking lips are preferably truncated and the various edges are preferably rounded to avoid slitting of the panel during the installation of the nut, which is described below. The tapered outer side walls 70 of the clinching lips are defined at a steeper angle than the tapered outer side walls 78 of the spanking lips 62. Other details of the preferred embodiment of the die member 24 will be more fully understood from the following description of the method of forming a nut and panel assembly.

As described, the pierce nut 20 is forced into contact with the panel 22 by a pierce nut installation head or apparatus and the panel is supported on the die member 24, or vice versa. As shown in FIGS. 7 and 8, the opposed internal end walls 54 of the die opening 52 of the die member receive the end walls 30 of the pierce nut and the opposed side walls 56 of the die opening receive the side walls 46 of the pilot 26. A rectangular slug, shown in phantom in FIG. 8 at 84, is pierced from the panel by the end face 28 of the pilot and the pilot 26 is received through the pierced panel opening. The distance between the end walls 54 of the die opening is less than the width of the pierce nut, measured between the end walls 30. As shown in FIG. 7, the end walls of the nut are thus simultaneously sheared and deformed outwardly, beneath the panel 22, to form ledge abutments 86 in the end walls 30 of the nut. The top corners of the pilot are simultaneously sheared and deformed by the arcuate corners 58 of the die opening to form ledge abutments beneath the panel at the corners, see 26a of FIG. 5. The ledge abutments 86 bear against and support the distal ends 22a of the panel, adjacent the pierced panel opening at the end walls 30 and corners 26a of the nut.

The panel 22 bottoms on the bearing faces 34 of the flange members 32, as shown in FIG. 8. The bearing surfaces 34 and the deformed ledge abutments 86 thus provide bearing support for the pierce nut on all four sides and the corners of the nut and the nut is in sealing contact with the panel. The side edges of the panel, adjacent the pierced panel opening, are simultaneously deformed into the re-entrant grooves 36 of the nut by the clinching lips 60, as shown in FIG. 8. The top or end faces 68 and the tapered outer walls 70 of the clinching lips deform the panel portion 22b, spaced from the distal panel edges 22c, into contact with the bottom walls 40 of the grooves. The distal edges 22c of the panel, adjacent the pierced opening in the panel, are simultaneously deformed into sealing contact with the inner groove walls 38 by the tapered inner walls 72 of the clinching lips. The inwardly tapering walls 72 of the panel clinching lips deform the distal edges 22c of the panel inwardly into sealing contact with the inner side walls 38 of the panel, spaced from the bottom wall 40 of the groove. The panel thus sealingly contacts both the bottom walls 40 and the inner walls 38 of the nut grooves, providing a two step seal.

As shown in FIGS. 5 and 6, the panel is continuous around the end face 28 of the pilot. The panel portions adjacent the side walls 46 of the pilot are continuous over the outer side walls 38 of the grooves (see also FIG. 8), including portions 22b which are deformed against the bottom walls 40 of the grooves. The truncated corners 80 of the die member (see FIG. 2) form angled panel portions 22d and prevent slitting of the panel at the ends of the grooves. Further, as described above, the nut is in bearing engagement with the panel 22 on all four sides and the corners of the pilot. The bearing supports are provided by the bearing faces 34 of the flange portions, on opposed sides of the pilot, and by the ledge abutments 86 formed in the end walls 30 of the nut and the top corners 26a of the pilot. The combination of the bearing engagement between the nut and panel and the unique deformation of the panel side edges in the grooves provide a low pressure fluid seal between the nut and panel assembly.

The fluid seal is tested by installing the nut in the bottom wall of a pan or tray and sealing the threaded bore 44 with a bolt or plug. The pan or tray is then filled with water or other fluid and left to stand for several hours. If no leakage occurs between the nut and panel assembly, the seal is considered sufficient for automotive applications requiring a low pressure seal. The disclosed nut and panel assembly of this invention will meet these requirements.

It will be understood, however, that various modifications may be made to the nut and panel assembly, method and apparatus of this invention within the preview of the appended claims. The die member is preferably formed of tool steel to assure dimensional stability in multiple applications. The dimensions of the pierce nut and die assembly will depend upon the particular application. In a typical application installing a pierce nut having a nominal pilot width of 0.368 inches, measured between the side walls 46, and a nominal length of 0.447 inches, measured between the end walls 30 of the pierce nut, the opening in the die member is 0.37 inches, square. The side walls 46 of the pilot are thus closely received in the die opening as shown in FIG. 8, and the end walls are deformed as shown in FIG. 7.

Having thus described the method of forming a low pressure fluid sealed nut and panel assembly, method and apparatus of this invention, I claim:

1. A method of forming a low pressure fluid sealed out and panel assembly, said nut including a rectangular pilot having a top portion for piercing an opening in said panel, said nut having end walls generally perpendicular to the top face of said pilot and flange portions on opposed sides of said pilot, said flange portions having bearing surfaces generally parallel to and lying in a plane spaced from said pilot top portion, said nut having generally parallel grooves on opposed sides of said pilot in said flange bearing surfaces, said grooves each hving an inner side wall adjacent said pilot, a bottom wall and an outer side wall extending to said flange bearing surfaces, the method comprising:
 (a) engaging said nut pilot end against said panel and piercing said panel with said pilot top portion;
 (b) shearing and deforming the outer edge of said nut end walls toward the plane of said flange bearing surfaces and simultaneously shearing and deforming the four top corners of said pilot toward the plane of said flange bearing surfaces forming a panel bearing surface on said pilot spaced below said pilot top face extending substantially the length of said nut end walls and around said pilot corners into said grooves with the pierced edges of said panels supported on said pilot panel bearing surface in sealed relation;
 (c) forming said panel into bearing contact with said flange bearing surfaces and deforming the pierced panel edges located between said flange bearing surfaces and said pilot into the openings of said nut grooves;
 (d) continuing to deform said pierced panel edges into said nut grooves until said panel engages said groove bottom walls spaced from said pierced panel edges and deforming said panel edges into sealing engagement with said inner groove walls spaced from said groove bottom walls; and
 (e) the panel portion deformed in said nut grooves being continuous with the main portion of said panel and said panel in bearing sealing engagement with said bearing surfaces of said pilot and said flanges, providing a continuous low pressure seal between said nut and said panel.

2. The method of forming a low pressure fluid sealed nut and panel assembly as defined in claim 1, including shearing and deforming said top pilot corners in semi-circular arcs forming an arcuate panel bearing surface at the corners of said nut pilot continuous with the panel bearing surfaces on said nut end walls with said pierced panel edges in bearing sealing engagement with said continuous pilot bearing surfaces.

3. The method of forming a low pressure fluid sealed nut and panel assembly as defined in claim 1, including deforming said panel into said grooves in a U-shape in bearing engagement with said outer side walls, said bottom walls and said inner side walls spaced from said bottom walls.

4. The method of forming a low pressure fluid sealed nut and panel assembly as defined in claim 1, wherein said nut grooves are re-entrant having relatively inclined inner and outer side groove walls defining a restricted opening adjacent said flange bearing surfaces, including deforming said panel in a U-shape in said re-entrant grooves in bearing sealing engagement with said relatively inclined side walls adjacent said restricted opening spaced from the engagement with said bottom wall.

* * * * *